United States Patent [19]

Turner

[11] Patent Number: 4,971,344
[45] Date of Patent: Nov. 20, 1990

[54] BICYCLE WITH A FRONT FORK WHEEL SUSPENSION

[75] Inventor: Paul H. Turner, Boulder, Colo.
[73] Assignee: Rockshox, Inc., Fletcher, N.C.
[21] Appl. No.: 293,257
[22] Filed: Jan. 4, 1989
[51] Int. Cl.$^5$ ............................................. B62K 25/08
[52] U.S. Cl. .................................... 280/276; 188/280
[58] Field of Search ............... 280/276, 283, 286, 284, 280/275, 277; 188/271, 272, 287, 280, 322.15; 267/226, 221

[56] References Cited

U.S. PATENT DOCUMENTS

| | | | |
|---|---|---|---|
| 638,723 | 12/1899 | Kelly | 280/277 |
| 2,196,089 | 4/1940 | Wallace | 267/64.15 |
| 2,472,841 | 6/1949 | Ochs | 188/322.15 |
| 3,199,638 | 8/1965 | Otomo | 188/322.15 |
| 3,208,767 | 9/1965 | Moulton | 280/276 |
| 3,232,390 | 2/1966 | Chano | 188/322.15 |
| 3,301,575 | 1/1967 | Ryan et al. | 280/275 |
| 3,459,441 | 8/1969 | Hornsby | 280/276 |
| 3,810,659 | 5/1974 | Marcil | 280/276 |
| 3,891,236 | 6/1975 | Kuwano et al. | 280/283 |
| 3,912,054 | 10/1975 | Fabre et al. | 280/276 |
| 3,964,765 | 6/1976 | Zenser | 280/276 |
| 4,057,264 | 11/1977 | Suzuki et al. | 280/276 |
| 4,145,067 | 3/1979 | Ceriani | 280/276 |
| 4,367,882 | 1/1983 | Alexander et al. | 280/276 |
| 4,392,664 | 7/1983 | Tsuchiya et al. | 280/276 |
| 4,502,672 | 3/1985 | Meller et al. | 267/64.17 |
| 4,515,384 | 5/1985 | Honma et al. | 280/276 |
| 4,553,769 | 11/1985 | Kawaguchi | 280/276 |
| 4,573,697 | 3/1986 | Schier | 280/276 |
| 4,609,202 | 9/1986 | Miyakoshi et al. | 280/276 |
| 4,749,068 | 6/1988 | Sirven | 188/269 |
| 4,789,174 | 12/1988 | Lawwill | 280/284 |
| 4,807,860 | 2/1989 | Simons | 267/217 |
| 4,809,829 | 3/1989 | Hummel et al. | 188/322.15 |
| 4,815,763 | 3/1989 | Hartmann | 280/276 |

FOREIGN PATENT DOCUMENTS

| | | | |
|---|---|---|---|
| 0245221 | 11/1987 | European Pat. Off. | 280/276 |
| 1575132 | 5/1970 | Fed. Rep. of Germany . | |
| 3513974 | 9/1986 | Fed. Rep. of Germany | 280/276 |
| 1036016 | 9/1953 | France | 280/276 |

OTHER PUBLICATIONS

Judy Weisel, "Rock Shox: Off-Road Bicycle Suspension is Here!", *Mountain Bike Action Technical*, 5/89, pp. 64–66.
"Guide to Radical Forks", *Mountain Bike Action*, 5/90, pp. 90–92.
"Rock Shox", *Mountain & City Biking*, 7/90, pp. 55, 57–58.
Neue Hoffnung fur die Wirbelsaule, *Bike Magazin*, 3/90, pp. 58–61.

*Primary Examiner*—Mitchell J. Hill
*Attorney, Agent, or Firm*—Sixbey, Friedman, Leedom & Ferguson

[57] ABSTRACT

A resilient suspension system for the front wheel of a bicycle or the like which turns bump energy into viscous heat loss without absorbing the pedaling energy of the rider. The suspension system includes two telescoping tubes having fluid therein and a fluid valve that meters the fluid flowing between the two tubes on the compression and expansion of the tubes. The invention also employs certain design features so as to retain the structural rigidity of the front fork assembly while remaining light in weight and utilizing a majority of the standard bicycle wheel, brake and steering components.

17 Claims, 3 Drawing Sheets

BICYCLE WITH A FRONT FORK WHEEL SUSPENSION

BACKGROUND OF THE INVENTION

1. Field of the Invention

The present invention relates generally to wheel suspensions, and more particularly to front wheels suspensions on bicycles.

2. Description of the Prior Art

Many attempts at designing a resilient, shock-absorbing wheel suspension for bicycles have been made, and in all cases four main design factors and problems emerge. One, the mechanical system to effectively absorb bump energy must be light in weight. Two, the forces of pedaling a bicycle should not be absorbed in the system resulting in inefficiencies to the rider's energy output. Three, retain the structural rigidity of the front wheel must be maintained with respect to the handle bars steering the bicycle. Four, the suspension system must perform in conjunction with standard bicycle designs and components such as quick wheel removal, rim friction brakes, head set bearing assemblies, and removable handlebar connecting stems.

While the most obvious approach to designing a bicycle suspension system may be to incorporate current technologies from off-road motorcycles, there are several factors which limit its adaptability. Motorcycle suspensions are designed around the effects and demands of a high powered motor for locomotion, while a bicycle suspension must deal with the limited output of human power; the major difference being the cyclic loading of the suspension from pedaling a bicycle, also factors such as unloading of a motorcycle's suspension under power and loading of the suspension upon braking contribute to the differences. In addition, motorcycles encounter much greater speeds than that of a bicycle and have much greater acceleration of mass to deal with at those speeds.

Therefore, simply adapting current motorcycle technology onto a bicycle is not feasible. However, given the advanced design of motorcycle suspension there are some technologies which can be brought over and/or altered to meet the needs of a bicycle suspension system. These technologies being the telescopic sliding tube design and a shock-dampening system to turn bump energy into viscous heat loss.

SUMMARY OF THE INVENTION

It is an object of the present invention to provide a bicycle wheel suspension system which absorbs road shocks but does not absorb pedal drive energy.

It is another object of the present invention to provide a bicycle wheel suspension system which utilizes telescoping tubes and a hydraulic valve.

It is a further object of the present invention to provide a bicycle wheel suspension system which includes a cross-member between the two telescoping tubes to maintain torsional structural rigidity.

It is yet another object of the present invention to provide a bicycle wheel support structure which allows the brake cable to move along with the brake arms and wheel to permit braking of the wheel.

It is yet a further object of the present invention to provide a bicycle wheel suspension system which may be joined with standard parts of a bicycle frame including the front wheel, brakes and steering tube.

The bicycle wheel suspension system of the present invention includes two suspension assembly systems; one disposed on each leg of the front fork of a bicycle. Each suspension system includes two telescoping tubes having a hydraulic fluid therein and an air space. A spring-loaded valve regulates the flow of liquid between the two telescoping tubes, whereby road bump loads cause the fluid to move through the valve. The fluid movement permits the two telescoping tubes to slide relative to each other, thus absorbing the shock load of the road bump. The metering valve is spring-loaded, such that pedaling forces will not cause fluid to move through the valve whereas road bump forces, being substantially greater than pedal forces, will cause the shock absorbing-effects to be created.

It is an advantage of the present invention that it provides a bicycle wheel suspension system which absorbs road shocks but does not absorb pedal drive energy.

It is another advantage of the present invention that it provides a bicycle wheel suspension system which utilizes telescoping tubes and a hydraulic valve.

It is a further advantage of the present invention that it provides bicycle wheel suspension system which includes a cross-member between the two telescoping tubes to maintain torsional structural rigidity.

It is yet another advantage of the present invention that it provides bicycle wheel support structure which allows the brake cable to move along with the brake arms and wheel to permit braking of the wheel.

It is yet a further advantage of the present invention that it provides bicycle wheel suspension system which may be joined with standard parts of a bicycle frame including the front wheel, brakes and steering tube.

The foregoing and other objects, features and advantages of the present invention will be apparent from the following detailed description of the preferred embodiment, which makes reference to the several figures of the drawing.

DESCRIPTION OF THE PREFERRED EMBODIMENT

Figure 1:
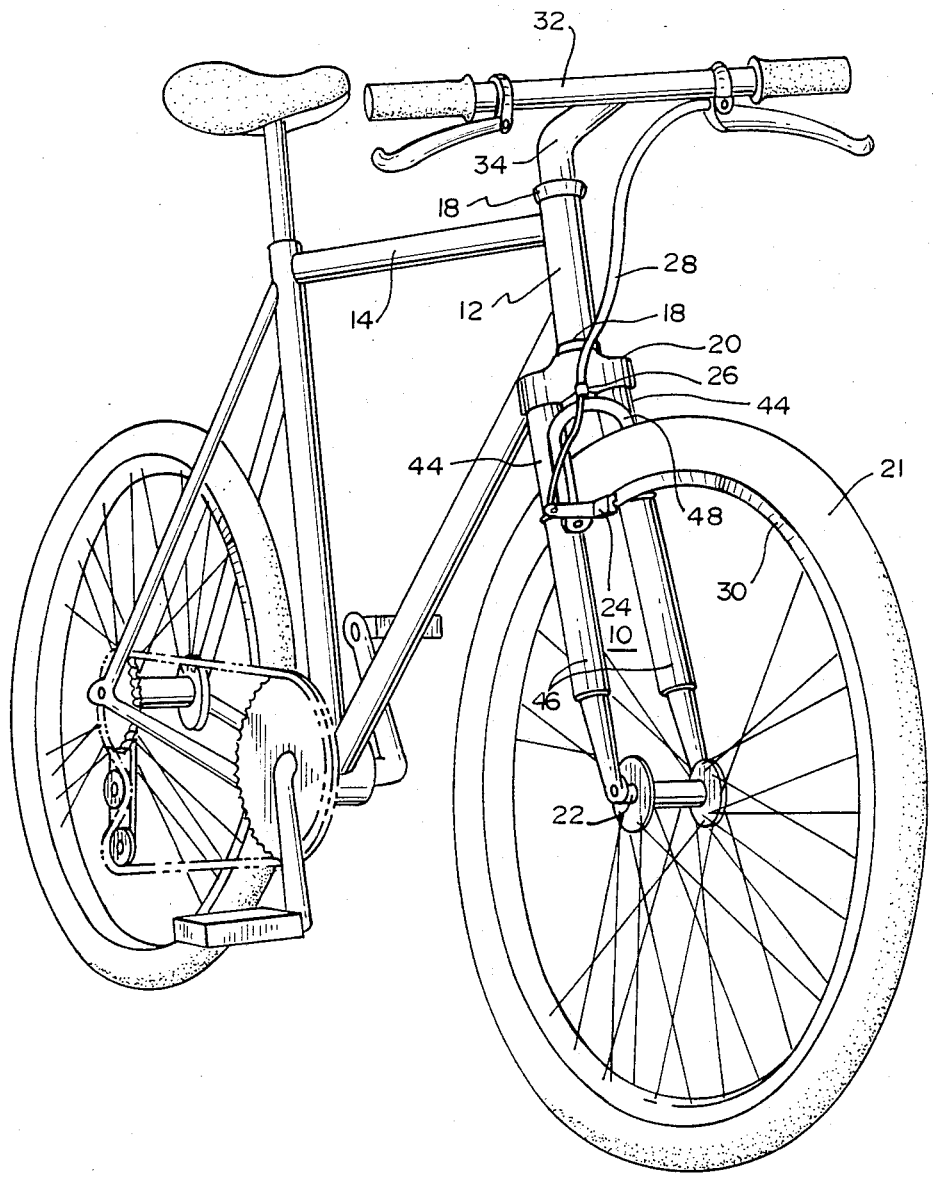
FIG. 1 is an overall view of a bicycle fitted with the invention.
Figure 2:
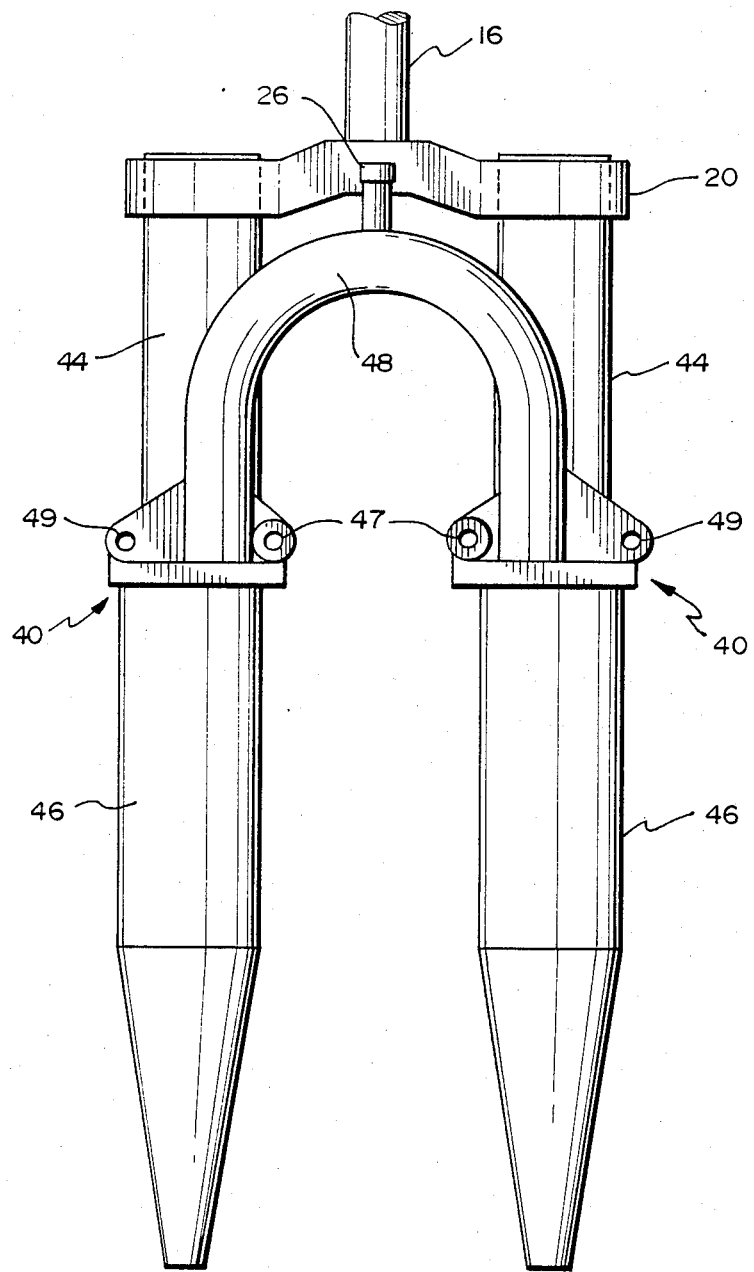
FIG. 2 is a detailed view of the invention's exterior and peripheral components.

As shown in FIGS. 1 and 2, the invention 10 mounts to the head tube 12 of a bicycle frame 14 by a hollow steering pipe 16 which is contained between two rotational bearings 18 along the steering axis. Mounted to the bottom end of the steering pipe 16 is a single upper crown 20 which clamps two telescoping suspension assemblies 40 off angle from the steering axis, so as to place the front wheel 21 forward of the line of steering axis. On a standard bicycle fork this is what is known as rake. Each telescoping assembly 40 is composed of an upper sliding tube 44 and an lower sliding tube 46 that fastens to the front wheel axle 22. Mounted to the lower sliding tubes 46 is a standard wheel rim friction type brake 24 and a cross member 48 to strengthen the two suspension assemblies 40. This cross member 48 features a cable stop 26 which allows the front brake cable 28 to float with the lower sliding tubes 46 and hence the rim 30 of the front wheel 21. Mounted to the upper end of the steering pipe 16 is a standard handlebar 32 and extension stem 34.

A significant design criteria was to maintain structural integrity of the system while still working within the parameters of current bicycle design and componentry and to keep the entire system light in weight. With a telescopic system, all of the torsional strength along each fork leg between the top connecting crown and the axle is lost. This is where a standard, rigid bicycle fork derives all of its structural rigidity with regard to torsional stress of handlebar and steering movements. In a typical telescopic front fork assembly, this structural rigidity is regained by the addition of another upper connecting crown at the top of the frame steering tube, but with a bicycle, this would add an unacceptable amount of weight and cause severe damage to the thin-walled frame tubes at full rotation of the steering. The preferred embodiment functions with only a single, lower connecting crown that regains this loss of torsional rigidity by means of the cross member 48 between the two lower telescoping tubes 46, which resists the telescoping tubes from going askew when the fork is loaded torsionally. This cross member 48 is connected to the lower telescoping tubes 46 utilizing two bolts that mount through two bolt holes 47 and 49 formed through both the cross member 48 and the lower tube 46, such that the cross member 48 does not allow a twisting or rotating motion of the suspension assemblies 40 at its attachment.

To maintain the use of rim brakes 24, a cable stop 26 is added to the cross member 48 to allow the brake cable to move in proportion to the brake arms and wheel. This feature allows the present invention to incorporate the standard bicycle rim type brake system.

Figure 3:
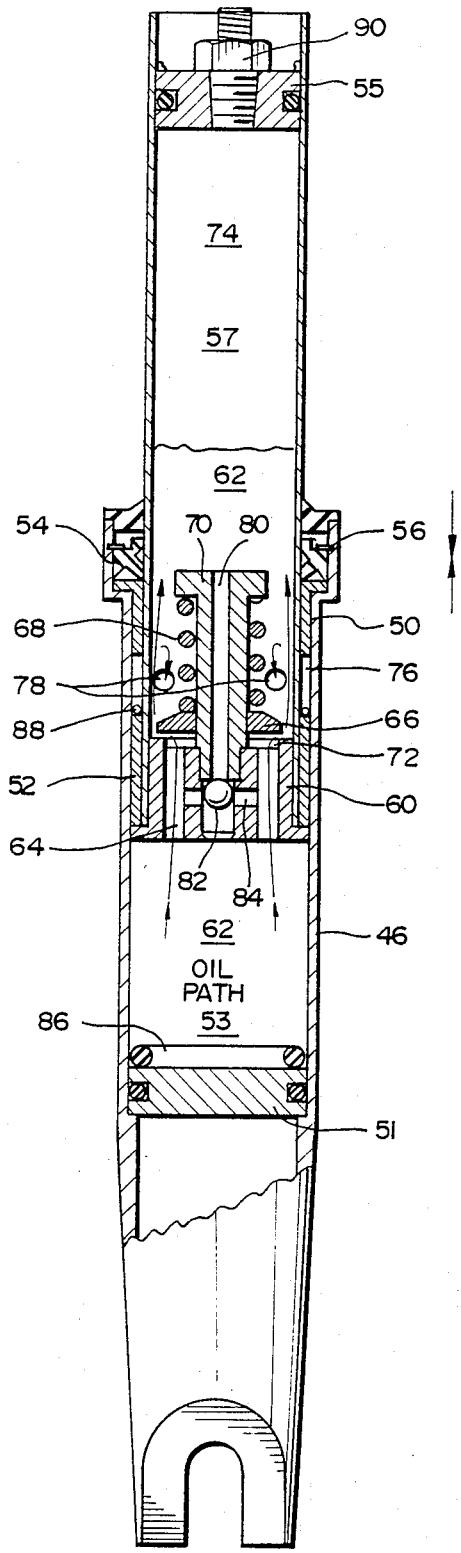
FIG. 3 is a side cross-sectional view of the telescoping tubes and valve of the present invention, shown in compression.
Figure 4:
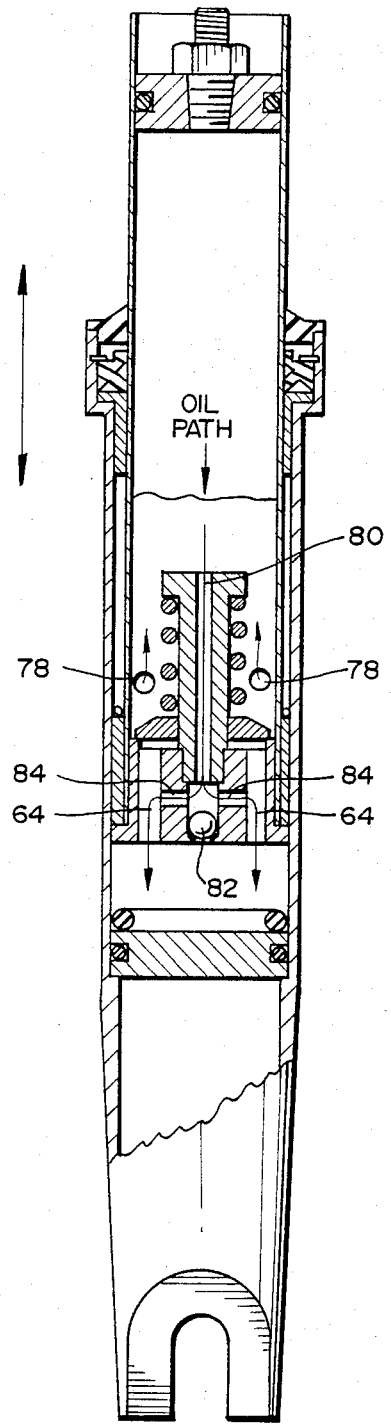
FIG. 4 is a side cross-sectional view of the telescoping tubes and valve of the present invention, shown in expansion.

The two telescoping suspension assemblies 40 are substantially identical, one of which is shown in FIG. 3. Each suspension assembly 40 is comprised of an upper sliding tube 44 and a lower sliding tube 46. The sliding motion of tubes 44 and 46 is guided by an upper bushing 50 that is fixed to the lower sliding tube 46 and which slidably engages the outer surface of the upper sliding tube 44, and a lower bushing 52 that is fixed to the upper sliding tube 44 and which slidably engages the inner surface of lower sliding tube 46. The telescoping tubes are sealed at the point of reciprocation by a seal 54 held in place by a snap ring 56 which also acts to hold the upper bushing 50 in place. With this technique the telescoping tubes 44 and 46 can be easily disassembled by simply removing the snap ring 56.

A lower sealing plate 51 is disposed within the lower tube 46 to create a chamber 53 for holding a viscous fluid medium 62. An upper sealing plate 55 is disposed within the upper tube 44 to create a chamber 57 for holding both the fluid 62 and an air space 74.

Threaded into the lower end of the inner sliding tube 44 is a dampening valve 60 to meter the flow of a viscous fluid medium 62 between chambers 53 and 57 upon compression and extension of the telescoping tubes. The configuration may be thought of as a single fluid chamber having a portion 53 thereof in lower tube 46, a portion 57 thereof in upper tube 44, and having a fluid metering valve 60 disposed therein to regulate the flow of fluid through the chamber. The dampening valve 60 features ports 64 extending through the body of the dampening valve 60 and blocked at the upper outlet by a plate 66 held closed by a compressed spring 68 held in place by a shouldered bolt 70. The flow of these ports 64 is joined together underneath the plate 66 by a counter-bored area 72 which creates a large pressure area underneath the plate 66. This counter-bored area 72 allows the build-up of fluid pressure force under the plate 66 to be greater than that of the ports 64 themselves. This greater initial build-up of fluid pressure in conjunction with the compressed or preloaded spring 68 creates a dampening characteristic that has much greater resistance at low input compressive forces (pedal forces) than in comparison to higher input forces (bump shock forces). This initial or low input force dampening is enough to lock the system and prevent the suspension from absorbing rider pedaling energy.

In the preferred embodiment, the inner diameter of the upper tube 44 is approximately 0.93 inches, the inner diameter of the lower tube 46 is approximately 1.1 inches. The diameter of the counter-bored area 72 is approximately 0.75 inches, and spring 68 has a stiffness of approximately 40 to 50 lbs/inch where hydraulic fluid having SAE 5 weight is used.

It is therefore to be realized that upon striking a road bump of sufficient size, a compressive load will be incurred by each of the telescoping suspension assemblies 40. The compressive load will cause the fluid 62 in the chamber 53 of lower tube 46 to be forced through the ports 64 in the valve 60 with sufficient pressure to overcome the spring-loaded valve plate 66, whereby fluid will enter chamber 57 of the upper telescoping tube 44. The entry of fluid into the upper tube 44 will cause compression of the air within the air space 74 of chamber 57. Additionally, the loss of fluid in the lower tube 46 will permit the two tubes 44 and 46 to slide compressively relative to each other, such that the opening space 76 between the bushings 50 and 52 will grow larger. A fluid port 78 is formed through the wall of the upper tube 44 proximate the lower edge of bushing 50, such that fluid in the upper tube 44 can pass through port 78 and into the opening space 76 between the two bushings 50 and 52. The sliding engagement of bushings 50 and 52 with tubes 44 and 46 respectively is a fluid-tight sliding seal, in order to promote the proper functioning of the suspension assemblies. For reasons described more fully hereinafter, port 78 is disposed approximately one tenth of an inch above the lower extension of bushing 50 when the two tubes 44 and 46 are in full extension.

Upon extension of the telescoping tubes 44 and 46 the viscous medium flows back through the valve 60 by means of a return port 80 located in the center of the shoulder bolt 70. The return port 80 is formed with a diameter of approximately 0.17 inches. Located at the bottom of the return port 80 is a one direction check-ball valve 82 that closes on the compression movement, and opens upon the extension movement of the system and allows the viscous medium 62 to flow through a bypass port 84 into the compression valve ports 64. When the system reaches full bottom, the tubes are protected from metal-to-metal contact by a bumper 86 of a resilient material.

At full extension of the system, the bushings 50 and 52 are protected by means of a hydraulic lock situation created by the viscous medium 62 flowing through the port 78 in the inner sliding tube 44 to the space 76 between the two telescoping tubes 44 and 46 and within the upper and lower bushings 50 and 52 when the system compresses. Because the location of the port 78 is one-tenth of an inch above the lower edge of bushing 50, as the system reaches a point just before full extension, the port 78 is closed off by the lower edge of upper bushing 50, and a hydraulic lock situation occurs in the space 76. This hydraulic lock prevents metal-to-metal contact of the two bushings 50 and 52 due to the inability of fluid to escape from space 76. In the preferred embodiment an o-ring 88 is placed in the space 76 to assure that no metal-to-metal contact will occur.

The telescoping system is pressurized with air through an air valve 90 located in the upper seal 55 of the upper tube 44. This gas pressure extends the system after it is compressed from absorbing bump energy, and can be altered in pressure to compensate for different rider weights or riding conditions. An air pressure of approximately 40 psi has been found to be acceptable.

The type of bumps detrimental to rider control on a bicycle are sudden impact bumps of one to six inches in height such as potholes, tree roots, rocks, ruts, etc. These are the types of bumps which cannot be absorbed into frame flex or by the human body, especially if encountered in multiple or rapid succession. Large bumps that are smooth in approach do not pose a threat to rider control, and small vibration bumps for the most part are absorbed by the resilient nature of the frame and tires.

Due to these constraints a hydraulic type of shock dampener was invented so as to not yield under the input forces of pedaling, yet give way under the greater input forces of bump impact by the wheel. It was possible to achieve this because of two phenomenons associated with the current invention. First, the amount of rider pedaling input force into the suspension is less than the amount of force that is required to move the suspension when encountering a sharp impact bump of one inch or more. Secondly, the wheel path of the suspension is off horizontal to the steering axis, causing the pedaling input force into the suspension to not be equal to the pedal forces created. A pedaling force of equal energy to that of a bump will have less affect on the suspension than the bump would.

It was necessary to design this system, which could accommodate the necessary dampening characteristics, to be light in weight. A telescoping tube design was chosen because of the minimum redundancy of materials and the path of suspension deflection. However, the problems encountered with prior telescopic suspension units was the use of a third or even fourth internal tube with which the dampening was created, and hence added weight. To overcome this, the present invention uses a single, simpler dampening system with an internal dampening valve. To this dampening valve a feature is incorporated, which locks out compressive movement of the suspension if input forces were less than that of sharp impact bumps of one inch or less. This dampening valve offers all the sophistication of previous designs. It is simpler because there are fewer moving parts; thus it requires the use of less materials and is therefore lighter in weight.

While the invention has been particularly shown and described with reference to certain preferred embodiments, it will be understood by those skilled in the art that various alterations and modifications in form and detail may be made therein. Accordingly, it is intended that the following claims cover all such alterations and modifications as may fall within the true spirit and scope of the invention.

What I claim is:

1. A bicycle wheel suspension system for the front fork of a bicycle, comprising:
    two suspension assemblies, one disposed within each leg of the front fork of a bicycle;
    each said suspension assembly including an upper telescoping tube and a lower telescoping tube, said telescoping tubes being configured such that one said telescoping tube is axially, slidably engaged within the other of said telescoping tubes;
    each said telescoping tube having a sealing plate disposed therein, said sealing plates being disposed to form a fluid-holding chamber, a respective portion of said chamber being disposed within each of said tubes; a fluid being disposed within said chamber;
    a fluid valve means being disposed within said chamber and functioning to meter the flow of said fluid from one of said tubes to the other of said tubes upon the axial, sliding movement of said tubes relative to each other;
    wherein said fluid in said chamber is sufficient in volume to fill said lower tube portion of said chamber upon the full slidable extension of said tubes, and to also fill a portion of said upper tube; said upper tube portion of said chamber having sufficient volume to hold all of said fluid upon full axial sliding compression of said tubes with an air space remaining in said upper tube portion of said chamber;
    wherein a first bushing is fixedly engaged to said upper tube and makes a fluid-tight sliding seal with said lower tube, and a second bushing is fixedly engaged to said lower tube and makes a fluid-tight sliding seal with said upper tube; and
    wherein a wall of one of said tubes has a port to permit the transfer of said fluid through said port and into a space between said bushings during axial sliding compressive movement of the tube tubes and the bushing on the other of said tubes is displaceable into a position blocking said port near the end of axially sliding extension of said tubes as a means for locking said tubes and preventing contact between said bushings.

2. in a pedal driven bicycle having a front fork with a wheel suspension of the type having a pair of telescoping suspension assemblies, each of which is disposed on a respective leg of the front fork, the improvement wherein each of the telescoping suspension assemblies has a fluid containing circuit means for controlling compression of the telescoping suspension assembly, said fluid containing circuit means including a means for preventing pedal drive energy absorption by locking the suspension assemblies against compression by resisting low input forces imposed upon the fork, via handlebar and frame portions of the bicycle, as a result of a pedaling action of a rider of the bicycle and for enabling compression of the suspension assemblies for absorption of impact shocks imposed upon the front fork by a wheel carried thereby by reacting under the effect of high input forces.

3. A wheel suspension according to claim 2, wherein each said suspension assembly includes an upper telescoping tube and a lower telescoping tube, said telescoping tubes being configured such that one said telescoping tube is axially, slidably engaged within the other of said telescoping tubes; and wherein said fluid circuit means comprises a fluid-holding chamber having a portion within each of said tubes, a viscous fluid being disposed within said chamber; and a pressure responsive fluid valve means disposed within said chamber for metering fluid flow from one of said tubes to the other of said tubes upon axial sliding movement of said tubes relative to each other, said valve having a normally closed position and opening under pressure forces that are greater than those created by pedaling and which correspond to those created by wheel impact shocks.

4. A wheel suspension system according to claim 3, wherein a quantity of said viscous fluid is disposed in said chamber which is insufficient to fill said chamber, and air space being located above said viscous fluid within said chamber, and wherein means for pressurizing said air space is provided to enable compensation for different rider weights and riding conditions.

5. A suspension system according to claim 3, wherein a first bushing is fixedly engaged to said upper tube to make a fluid-tight sliding seal with said lower tube, and a second bushing is fixedly engaged to said lower tube to make a fluid-tight sliding seal with said upper tube; wherein a space exists between said first bushing and said second bushing, and a port extends through the wall of one of said tubes to permit the transfer of said viscous fluid through said port, into and out of said space between said bushings upon compressive and expansive telescoping of the upper and lower tubes, respectively; and wherein, during expansive telescoping of said tubes, the one of said bushings which is engaged with the other of said tubes is displaceable with said other of the tubes into blocking relationship with respect to said port as a means for hydraulically locking said tubes against further expansive movement.

6. A wheel suspension system as described in claim 3, wherein said valve means includes a valve body and at least one first port formed through said body to permit said fluid to flow through said body from the portion of said chamber in one tube to the portion of said chamber in the other tube; and a displaceable valve plate is spring-loaded into a position in which the valve plate is disposed across said first port to block fluid from passing through said first port unless sufficient fluid pressure exists to overcome the spring force on said plate.

7. A wheel suspension system as described in claim 6, wherein said valve further includes a fluid return port, including a one-way check valve disposed in said return port, to permit fluid to flow from said upper tube to said lower tube.

8. A wheel suspension as claimed in claim 6, in which a counter-bore area is located under said valve plate, said counter-bore area being larger in area than said first port as a means for allowing a build-up of fluid pressure under the valve plate that is greater than that of the first port itself.

9. A wheel suspension system as described in claim 2, wherein the pair of suspension assemblies comprise upper and lower telescoping tubes, the upper tube of one assembly being joined to the upper tube of the other assembly by a single upper crown, and wherein a cross member in the form of a single unitary structural member is joined to the lower tube of each said suspension assembly in a manner functioning to limit twisting and rotating motion of said suspension assemblies.

10. A wheel suspension system according to claim 9, wherein a brake cable stop is provided in a manner which enables a front brake cable to float with the lower tubes of the telescoping assemblies.

11. A wheel suspension according to claim 10, wherein said brake cable stop is provided on said cross member.

12. A wheel suspension system according to claim 11, wherein a wheel rim brake is carried by the lower telescoping tubes at said cross member so as to enable the wheel rim brake to travel with the lower telescoping tubes.

13. A wheel suspension system according to claim 9, wherein a wheel rim brake is carried by the lower telescoping tubes so as to enable the wheel rim brake to travel with the lower telescoping tubes.

14. A wheel suspension system according to claim 13, wherein a brake cable stop is provided in a manner which enables a front brake cable to float with the lower tubes of the telescoping assemblies.

15. In a pedal driven bicycle having a front fork with a wheel suspension of the type having a pair of telescoping suspension assemblies, each of which is disposed on a respective leg of the front fork and has an upper and a lower telescoping tube, and damping means for controlling compression of the respective telescoping assembly, the improvement wherein a cross member interconnects a portion of a top part of one lower telescoping tube with a portion of a top part of the other lower telescoping tube as a means for limiting twisting and rotation thereof, and wherein a wheel rim brake is carried by the lower telescoping tubes at areas at which said cross member connects to said lower telescoping tubes so as to enable the rim brake to travel with the lower telescoping tubes.

16. A wheel suspension system according to claim 15, wherein a brake cable stop is provided in a manner which enables a front brake cable to float with the lower tubes of the telescoping assemblies.

17. In a pedal driven bicycle having a front fork with a telescopic front wheel suspension assembly, said suspension assembly having an upper telescoping tube and a lower telescoping tube slidably engaged one within the other, and a fluid containing circuit means for controlling compression of the telescoping suspension assembly, said fluid containing circuit means including a fluid-holding chamber having a portion in each of said tubes, a viscous fluid disposed in said chamber, and a pressure responsive fluid valve disposed within said chamber for metering fluid flow from one of said tubes to the other of said tubes, said valve means including a valve body and at least one first port formed through said body to permit said fluid to flow through said valve body from the portion of said chamber in one tube to the portion of said chamber in the other tube, and a displaceable valve plate which is spring-loaded into a position in which the valve plate is disposed across said first port to block fluid from passing through said first port unless sufficient fluid pressure exists to overcome the spring force on said plate; the improvement wherein said pressure responsive valve means is constructed as a means for preventing pedal drive energy absorption by locking the suspension assembly against compression by resisting lower input forces imposed upon the suspension assembly, via handlebar and frame portions of the bicycle, as a result of a pedaling action of a rider of the bicycle and for enabling compression of the suspension assembly for absorption of impact shocks imposed by a wheel carried thereby by reacting under the effect of high input forces, a counter-bore area being located under said valve plate which is larger in area than said first port as a means for allowing a build-up of fluid pressure under the valve plate that is greater than that of the first port itself in a manner creating a damping characteristic that has a much greater resistance at low input compressive forces than to high input compressive forces.

* * * * *

UNITED STATES PATENT AND TRADEMARK OFFICE
CERTIFICATE OF CORRECTION

PATENT NO. : 4,971,344

DATED : Nov. 20, 1990

INVENTOR(S) : Paul Turner

It is certified that error appears in the above-identified patent and that said Letters Patent is hereby corrected as shown below:

Column 6, line 38, "tube" should read -- two --.

Signed and Sealed this

Third Day of September, 1991

Attest:

HARRY F. MANBECK, JR.

*Attesting Officer*  *Commissioner of Patents and Trademarks*

REEXAMINATION CERTIFICATE (1669th)
United States Patent [19]
Turner

[11] B1 4,971,344
[45] Certificate Issued Mar. 24, 1992

[54] BICYCLE WITH A FRONT FORK WHEEL SUSPENSION

[75] Inventor: Paul H. Turner, Boulder, Colo.

[73] Assignee: Rockshox, Inc.

Reexamination Request:
No. 90/002,416, Aug. 26, 1991

Reexamination Certificate for:
Patent No.: 4,971,344
Issued: Nov. 20, 1990
Appl. No.: 293,257
Filed: Jan. 4, 1989

Certificate of Correction issued Sep. 3, 1991.

[51] Int. Cl.⁵ .................................... B62K 25/08
[52] U.S. Cl. ............................ 280/276; 188/280
[58] Field of Search ............. 188/71.9, 280; 280/276, 280/283, 284, 286, 275, 277; 267/221, 226

[56] References Cited
FOREIGN PATENT DOCUMENTS

| | | |
|---|---|---|
| 0245221 | 11/1987 | European Pat. Off. . |
| 930043 | 7/1947 | France .......................... 188/72.9 |
| 1036016 | 4/1953 | France ............................ 280/276 |
| 1045138 | 6/1953 | France . |
| 55-29609 | 3/1980 | Japan . |

OTHER PUBLICATIONS
Unknown "1954" publication, p. 180.

*Primary Examiner*—Mitchell J. Hill

[57] ABSTRACT

A resilient suspension system for the front wheel of a bicycle or the like which turns bump energy into viscous heat loss without absorbing the pedaling energy of the rider. The suspension system includes two telescoping tubes having fluid therein and a fluid valve that meters the fluid flowing between the two tubes on the compression and expansion of the tubes. The invention also employs certain design features so as to retain the structural rigidity of the front fork assembly while remaining light in weight and utilizing a majority of the standard bicycle wheel, brake and steering components.

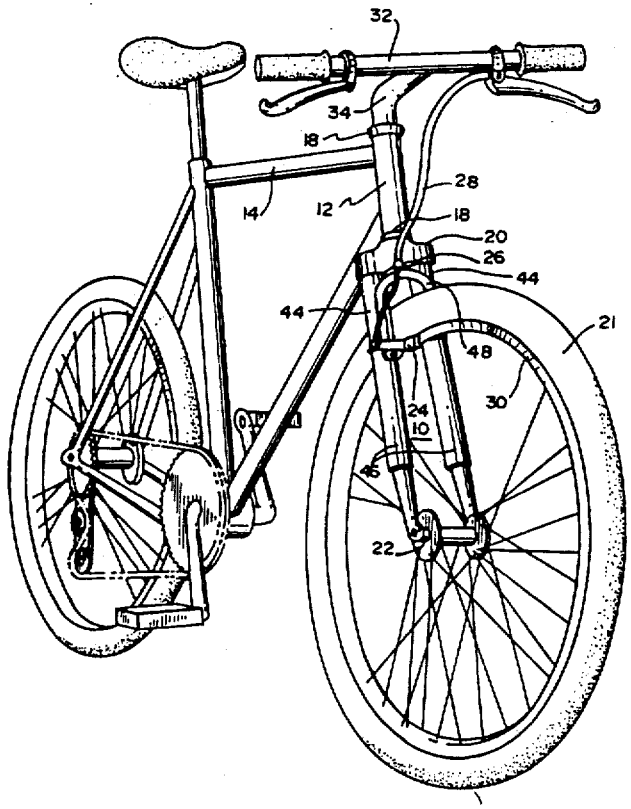
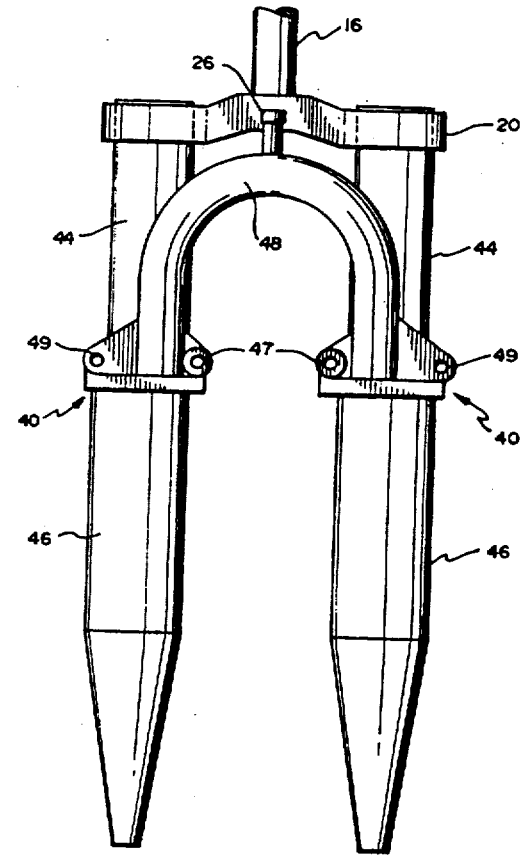

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 55-68 to Column 3, lines 1-6:

As shown in FIGS. 1 and 2, the invention 10 mounts to the head tube 12 of a bicycle frame 14 by a hollow steering pipe 16 which is contained between two rotational bearings 18 along the steering axis. Mounted to the bottom end of the steering pipe 16 is a single upper crown 20 which clamps two telescoping suspension assemblies 40 off angle from the steering axis, so as to place the front wheel 21 forward of the line of steering axis. On a standard bicycle fork this is what is known as rake. Each telescoping assembly 40 is composed of an upper sliding tube 44 and an lower sliding tube 46 that fastens to the front wheel axle 22. Mounted to the lower sliding tubes 46, *at proximal points*, is a standard wheel rim friction type brake 24 and a cross member 48 to strengthen the two suspension assemblies 40. This cross member 48 features a cable stop 26 which allows the front brake cable 28 to float with the lower sliding tubes 46 and hence the rim 30 of the front wheel 21. Mounted to the upper end of the steering pipe 16 is a standard handlebar 32 and extension stem 34.

AS A RESULT OF REEXAMINATION, IT HAS BEEN DETERMINED THAT:

The patentability of claims 1-14 and 17 is confirmed.

Claim 15 is determined to be patentable as amended.

Claim 16 dependent on an amended claim, is determined to be patentable.

15. In a pedal driven bicycle having a front fork with a wheel suspension of the type having a pair of telescoping suspension assemblies, each of which is disposed on a respective leg of the front fork and has an upper and lower telescoping tube, and damping means for controlling compression of the respective telescoping assembly, the improvement wherein a cross member interconnects a portion of a top part of the one lower telescoping tube with a portion of a top part of the other lower telescoping tube as a means for limiting twisting and rotation thereof, and wherein a *cable-operated* wheel rim brake is carried by the lower telescoping tubes [at areas] *proximal to each said portion* at which said cross member connects to said lower telescoping tubes so as to enable the rim brake to travel with the lower telescoping tubes.

* * * * *